United States Patent
Burchardt

(10) Patent No.: US 12,483,034 B2
(45) Date of Patent: Nov. 25, 2025

(54) METHOD AND SYSTEM FOR USING SECOND LIFE BATTERIES AS ENERGY STORAGE IN A RENEWABLE ENERGY SYSTEM

(71) Applicant: ECO STOR AS, Oslo (NO)

(72) Inventor: Trygve Burchardt, Howell, MI (US)

(73) Assignee: ECO STOR AS, Oslo (NO)

( * ) Notice: Subject to any disclaimer, the term of this patent is extended or adjusted under 35 U.S.C. 154(b) by 693 days.

(21) Appl. No.: 17/582,709

(22) Filed: Jan. 24, 2022

(65) Prior Publication Data
US 2022/0149630 A1 May 12, 2022

Related U.S. Application Data

(63) Continuation of application No. PCT/IB2020/057117, filed on Jul. 28, 2020.
(Continued)

(51) Int. Cl.
*H02J 7/00* (2006.01)
*B60L 58/12* (2019.01)
(Continued)

(52) U.S. Cl.
CPC ............. *H02J 3/322* (2020.01); *B60L 58/12* (2019.02); *B60R 16/033* (2013.01); *H02J 3/003* (2020.01);
(Continued)

(58) Field of Classification Search
CPC .... H02J 3/322; H02J 3/003; H02J 3/32; H02J 7/0013; H02J 7/0048; H02J 7/007;
(Continued)

(56) References Cited

U.S. PATENT DOCUMENTS

2007/0284159 A1* 12/2007 Takami ................... B60L 50/16
429/61
2016/0190821 A1* 6/2016 Lee .......................... H02J 7/007
320/134
(Continued)

FOREIGN PATENT DOCUMENTS

EP 2 822 140 1/2015
EP 2 982 999 2/2016
(Continued)

OTHER PUBLICATIONS

International Search Report and Written Opinion on PCT PCT/IB2020/057117 dated Sep. 18, 2020.

*Primary Examiner* — Zixuan Zhou
(74) *Attorney, Agent, or Firm* — Foley & Lardner LLP

(57) ABSTRACT

A novel renewable energy system is disclosed. The renewable energy system combines second life electric vehicle batteries to form an energy storage system. The energy storage system may compensate for large variations in operational energy and power requirements. The energy storage system is enabled through reuse of unopened electric vehicle batteries after their end first life use (e.g., in automotive use). The energy storage system within the renewable storage system may include a plurality of second life electric vehicle batteries, which may be configured to controllably store and provide power for a variety of applications. In some embodiments, the energy storage system may be operably coupled to one or more photovoltaics, fast chargers, or other variable loads that operate on DC currents. In various embodiments, the renewable energy system containing the energy storage system may require only one bidirectional inverter, which may be connected to a grid.

19 Claims, 5 Drawing Sheets

Related U.S. Application Data

(60) Provisional application No. 62/879,575, filed on Jul. 29, 2019.

(51) Int. Cl.
   *B60R 16/033*   (2006.01)
   *H02J 3/00*      (2006.01)
   *H02J 3/32*      (2006.01)

(52) U.S. Cl.
   CPC .............. *H02J 3/32* (2013.01); *H02J 7/0013* (2013.01); *H02J 7/0048* (2020.01); *H02J 7/007* (2013.01); *H02J 2300/20* (2020.01); *H02J 2310/48* (2020.01)

(58) Field of Classification Search
   CPC . H02J 2300/20; H02J 2310/48; B60R 16/033; B60L 58/12
   USPC ........................................................ 320/101
   See application file for complete search history.

(56)           References Cited

U.S. PATENT DOCUMENTS

2018/0041067 A1    2/2018  Chazal et al.
2019/0052119 A1*   2/2019  Hendrix ................ H02J 7/0018

FOREIGN PATENT DOCUMENTS

WO    WO-2019/010126        1/2019
WO    WO-2019010126 A1 *    1/2019

* cited by examiner

METHOD AND SYSTEM FOR USING SECOND LIFE BATTERIES AS ENERGY STORAGE IN A RENEWABLE ENERGY SYSTEM

CROSS-REFERENCE TO RELATED PATENT APPLICATIONS

This application is a continuation of PCT/IB2020/057117, filed Jul. 28, 2020, which claims the benefit of and priority to U.S. Patent Application No. 62/879,575, filed Jul. 29, 2019, the entire disclosures of which are hereby incorporated by reference herein.

BACKGROUND

This disclosure relates a method and system for enabling construction of a renewable energy system having an architecture that exploits inherent properties (e.g., high charge/discharge rate capacity, advanced battery management systems, packs including fuses and switches, compact packaging, etc.) associated with unopened second life electric vehicle (EV) batteries and using such EV batteries to build innovative energy storage systems.

Grid-connected energy storage systems with integrated renewable energy sources are often not feasible due to the high cost of renewables in many applications and thus, an improved systems for energy delivery and is needed to facilitate market penetration.

Energy storage is relatively expensive, and with correspondingly high costs associated with installed systems, it is often necessary to compromise performance (i.e., operate the system with non-ideal operational parameters, implement a system with a lower power rating) to favor cost efficiency. For example, high material and operational costs may prohibit energy storage systems from being scaled to store optimal amounts of energy from photovoltaics, or decrease rated power capability such that the system is unable to provide load leveling over optimal time periods or at optimal power levels.

Accordingly, it would be advantageous to provide a renewable energy system that is cost-effective, efficient, and can generate sufficient power to support a spectrum of applications.

SUMMARY

The foregoing summary is illustrative only and is not intended to be in any way limiting. In addition to the illustrative aspects, embodiments, and features described above, further aspects, embodiments, and features will become apparent by reference to the following drawings and the detailed description.

According to an exemplary embodiment, a method for reusing an unopened electric vehicle battery within a renewable energy system, the method comprising: receiving, by a central controller within an energy storage system, a signal from a control unit coupled to an electric vehicle battery; determining, by the central controller, a status of the electric vehicle battery based on the received signal; receiving, by the central controller, a current load demand associated with the energy storage system; allocating, by the central controller, the electric vehicle battery to a load application based on the current load demand; and switching, by the central controller, the electric vehicle battery from a first operational mode to a second operational mode.

According to an exemplary embodiment, switching the electric vehicle battery from the first operational mode to the second operational mode is based on the status of the electric vehicle battery.

According to an exemplary embodiment, switching the electric vehicle battery from the first operational mode to the second operational mode is based on a type of load demand.

According to an exemplary embodiment, switching the electric vehicle battery from the first operational mode to the second operational mode is based on a time of day.

According to an exemplary embodiment, the method further comprises: determining, by the central controller, a power delivery amount from a renewable energy source coupled to the energy storage system; and wherein the current load demand state is based on the power delivery amount.

According to an exemplary embodiment, the method further comprises: accumulating, by the central controller, historical information associated with the energy storage system; comparing, by the central controller, the current load demand to the historical information; and predicting, by the central controller, a future load condition based on the comparison of the current load demand and the historical information.

According to an exemplary embodiment, a method for reusing unopened electric vehicle batteries within a renewable energy system, the method comprising: receiving, by a central controller within an energy storage system, a plurality of signals from a corresponding plurality of control units; wherein the plurality of control units further correspond to a plurality of electric vehicle batteries, and wherein each of the plurality of control units is operatively coupled to each of the plurality of electric vehicles, respectively; determining, by the central controller, a current load demand associated with the energy storage system; and allocating, by the central controller, a first subset of the plurality of electric vehicle batteries to a first load application based on the current load demand.

According to an exemplary embodiment, the method further comprises: determining, by the central controller, a size of the first subset of the plurality of electric vehicles; and wherein the size is based on a magnitude of the load demand.

According to an exemplary embodiment, the method further comprises: determining, by the central controller, a power delivery amount from a renewable energy source coupled to the energy storage system; and wherein the current load demand state is based on the power delivery amount.

According to an exemplary embodiment, the method further comprises: determining, by the central controller, a second subset of the plurality of electric vehicle batteries; and allocating, by the central controller, the second subset of the plurality of electric vehicle batteries to a second load application based on the load demand.

According to an exemplary embodiment, the method further comprises: identifying, by the central controller, a first electric vehicle battery within the first subset of the plurality of electric vehicle batteries; and identifying, by the central controller, a second electric vehicle battery within the second subset of the plurality of electric vehicle batteries; reallocating, by the central controller, each of the first electric vehicle battery and the second electric vehicle battery such that the first electric vehicle battery is moved to the second subset of the plurality of electric vehicle batteries and the second electric vehicle battery is moved to the first subset of the plurality of electric vehicle batteries.

According to an exemplary embodiment, reallocating each of the first electric vehicle battery and the second electric vehicle battery is based on a time of day.

According to an exemplary embodiment, each of the first electric vehicle battery and the second electric vehicle battery is based on an updated load state associated with the energy storage system.

According to an exemplary embodiment, the method further comprises: switching, by the central controller, the first subset of the plurality of electric vehicle batteries from a charging state to a discharging state; and switching, by the central controller, the second subset of the plurality of electric vehicle batteries from a discharging state to a charging state.

According to an exemplary embodiment, a renewable energy system for reusing unopened second life electric vehicle batteries, the system comprising: an energy storage unit, wherein the energy storage unit includes an electric vehicle battery having a coupled control unit; a central controller within the energy storage unit, wherein the central controller is operably coupled to the electric vehicle battery via the control unit. The central controller is be configured to: receive a signal from the control unit coupled to the electric vehicle battery; determine a status of the electric vehicle battery based on the received signal; determine a current load demand associated with the energy storage system; allocate the electric vehicle battery to a load application based on the current load demand; and switch the electric vehicle battery from a first operational mode to a second operational mode.

According to an exemplary embodiment, wherein the energy storage unit is operably coupled to a renewable energy source and wherein the renewable energy source is configured to deliver energy to the energy storage unit.

According to an exemplary embodiment, the controller is further configured to determine a power delivery amount from the renewable energy source, wherein the current load demand state is based on the power delivery amount.

According to an exemplary embodiment, the controller is further configured to: accumulate historical information associated with the energy storage system; compare the current load demand to the historical information; and predict a future load condition based on the comparison of the current load demand and the historical information.

According to an exemplary embodiment, the controller is configured to switch the electric vehicle battery from the first operational mode to the second operational mode based on a type of load demand.

According to an exemplary embodiment, the controller is configured to switch the electric vehicle battery from the first operational mode to the second operational mode based on a time of day.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION

Figure 1:
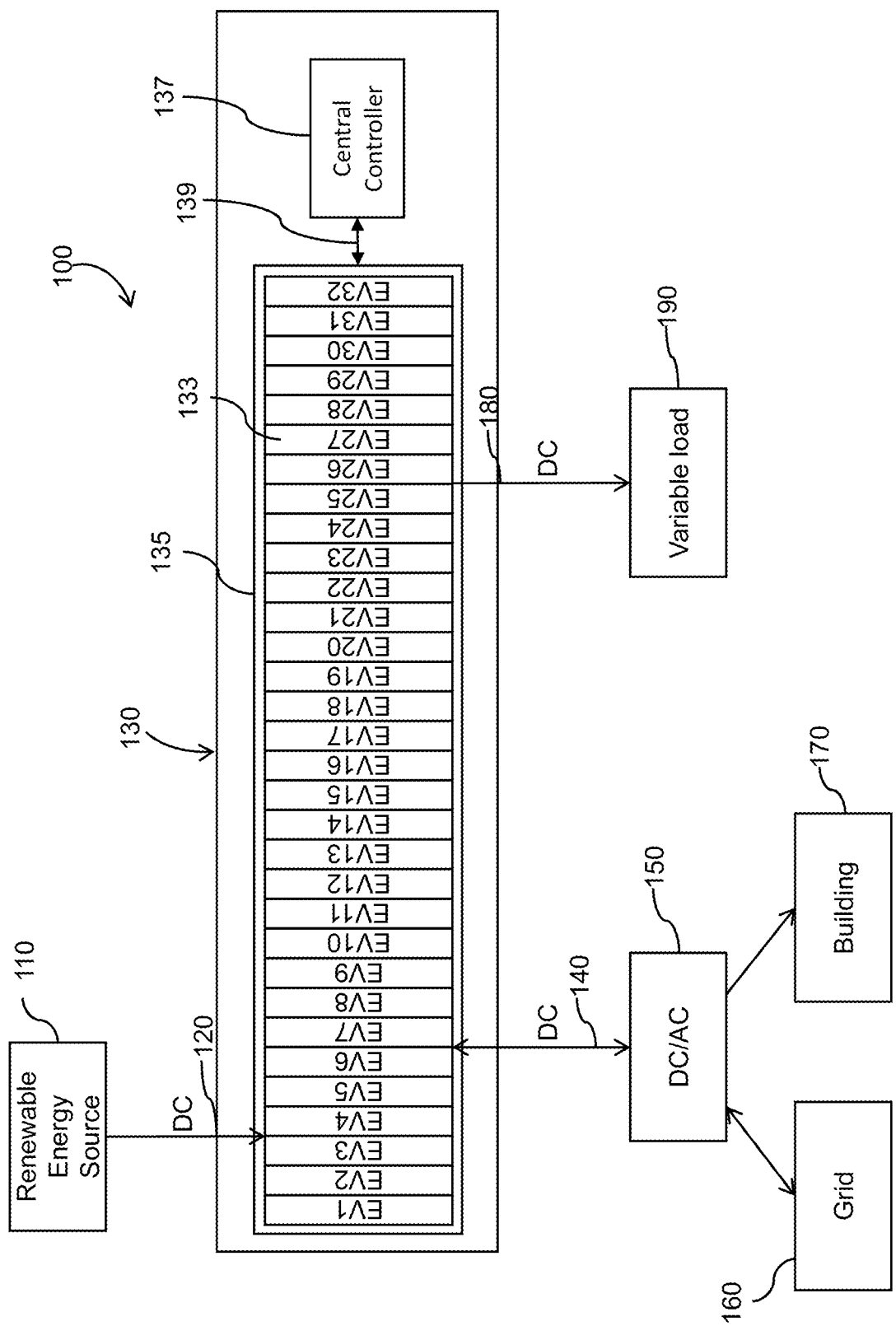
FIG. 1 shows a schematic representation of a renewable energy system where produced and consumed energy is stored, delivered to, or supplied from an energy storage system (ESS), according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Second life use of EV batteries, after the end of a first life use (e.g., end of automotive use), may serve as a viable means for reducing costs of energy storage as, generally, power to energy ratios for second life EV batteries are often high. For example, although typical energy storage systems have power to energy ratios of 1:1 or 1:2, some EV batteries may have power to energy ratios of 3:1 or more (e.g., Nissan® Leaf Generation 1 battery rated at 24 kWh but capable of delivering 90 kW). Accordingly, use of second life EV batteries may enable new configurations of energy storage systems. For instance, a multipurpose energy storage system can be developed. In an energy storage system, both charging and discharging of EV battery packs can take place at the same time. This is enabled by the high power rating of the EV packs enabling the energy storage systems to run without utilizing all the EV packs at the same time for discharge. This allows the opportunity to create new system architectures. Due to limitations of new batteries and the estimated increased costs, this is probably not a viable solution for energy storage systems using new batteries.

A used electric vehicle battery (EV) often contains a large number of single battery cells or battery modules, packaged into a hermetically sealed steel frame, and connected together in parallel and/or in series to give a required output voltage and current. In addition, the EV battery may include a battery management system that monitors the performance of the batteries and secures safe operations. To comply with automotive safety quality standards a number of sensors are frequently included within the battery pack. Historical data such as, but not limited to, temperature during charge and discharge, state of charge and state of discharge, cycle number, cell voltages etc. may be gathered during the automotive life of the battery and stored within a BMS (Battery Monitoring System).

Generally, reuse of EV batteries involves disassembly of the batteries by opening the pack and removing the cells or modules. Removed cells or modules can then be sorted based on various parameters (e.g., voltages, capacities, and/or impedances), wherein the cells and modules having the most desirable parameters (e.g., based on predetermined benchmarks) are selected for reuse. It is commonly held that, following use of an EV battery within an automotive application, a variation in cell impedance and cell voltage is large within the battery pack; however, this is frequently not the case.

Generally, sourcing batteries for automotive applications places stringent requirements on battery manufacturers and, typically, only tier 1 products are accepted. Furthermore, a BMS developed for automotive use is more advanced in comparison to low cost consumer electronics and power tools. Accordingly, battery performance in automotive applications is, in comparison to use in other electronics and contrary to popular opinion, correspondingly increased. Thus it would be advantageous to provide methods for reusing a complete battery within energy storage systems, including methods for facilitating system integration and inclusion of corresponding necessary hardware and software controls.

Currently, repurposing EV batteries generally requires opening the battery packs. Accordingly, the present disclosure describes a new architecture for a renewable energy system based on an ESS that implements repurposed EV batteries. Since a BMS of an unopened EV battery is generally reprogrammed to adjust to new uses (i.e., reprogrammed from automotive use to energy storage use), it enables construction of renewable energy systems that may implement an ESS comprising second life EV batteries. In such an EES, the second life EV batteries may be operably coupled to a central controller. Since each unopened battery includes a complete BMS and corresponding control unit, each battery/battery pack within the ESS may operate independently within the ESS. Furthermore, automotive EV batteries, which may be used for second life applications, typically have power to energy ratios that exceed usual metrics used in an ESS application. Accordingly, use of EV batteries may be implemented within an ESS to enhance performance and expand potential use and/or capability.

In addition, the present disclosure provides a method and system in which an ESS may deliver and/or receive all energy/power passed through a renewable energy system. Such a system may be advantageous as it would require only one bidirectional DC/AC inverter to run simultaneous AC and DC operations and/or simultaneously charge and discharge batteries within the ESS. In various embodiments of the proposed system, photovoltaic solar panels may deliver DC energy to a battery ESS directly over a low cost DC-bus (i.e., a DC-bus for such applications may cost less than 50% of the cost of an AC/DC inverter). The battery ESS may store the energy received from the photovoltaic solar panels and can deliver the stored energy as DC to a coupled variable load (e.g., a fast charger). In various embodiments, the battery ESS may be coupled to and charged a grid via a bidirectional inverter. In various embodiments, the renewable energy system may only require one bidirectional inverter, which may reduce costs frequently associated with requiring additional inverters.

Accordingly, it is among the objectives of the present disclosure to provide a method and system to facilitate construction of a renewable energy system with an ESS that implements unopened second life EV batteries.

It is further among the objectives of the present disclosure to provide a method and system to enable a central controller within the ESS to allocate EV batteries to different use applications based on energy needs by changing a number of EV batteries allocated to one application or use.

It is further among the objectives of the present disclosure to provide a method and system to enable a flexible and multi-purposed renewable energy system that requires only one bidirectional inverter.

In large part, existing proposals for improving renewable energy systems relate to the use of new batteries within an ESS in renewable energy system. Although a few proposals relate to use of second life EV batteries, no known proposals relate to renewable energy systems that use unopened second life EV batteries within the ESS nor consider potential benefits associated with using unopened EV battery within an ESS of a renewable energy system.

A common misperception is that cell voltages within second life batteries may be unbalanced after a first life in automotive applications. In addition, there is a misperception that second life battery capacity may be low and that a state of the complete, unopened battery may include cells with suboptimal performance. These misperceptions have likely arisen due to assumptions related to the demanding environmental and operational conditions EV batteries are typically subjected to. For example, in an EV, an EV battery pack is frequently required to operate at extreme temperatures (i.e., both high and low temperatures) and deliver and receive high power (e.g., to accommodate EV acceleration, fast charging, etc.) while recharging of the EV battery is frequently not well-controlled. In such applications, the end user (e.g., driver of an EV) is responsible for battery charging (e.g., plugging in the EV), the battery may sometimes be charged for long periods of time while other charging periods may be short. Consequently, battery may be operated during various partially discharged and partially charged states. In addition, historical data retrieved from first life consumer electronic products that use batteries similar to those used in EV applications (i.e., Li-ion batteries) often have low predicted lifetime expectancies, which likely contributes to the misperception after end of first life use in automotive applications, a complete EV battery should be opened and rebuilt so only the deemed best cells are repurposed for second lift use. Testing of EV battery packs after the end of first life use in automotive applications has instead shown that cells within EV batteries are mostly well balanced, and thus the battery may operate well when repurposed in an unopened state.

The present disclosure provides a method for an innovative use of second life batteries in an ESS (energy storage system), and in combination with renewable energy sources. In various embodiments, the method further includes delivery of energy from the ESS to a fast charging station, delivery of energy to buildings (or other structures), and delivery to/from a grid.

Generally, energy storage has been proposed by many as a potential solution for facilitating handling intermittent power delivery from renewable sources, including, but not limited to, wind and solar. A primary challenge in implementing energy storage is due to associated cost as energy storage solutions are typically expensive. Furthermore, when a battery is used to store energy, the battery is typically charged and discharge using DC (direct current) power. To deliver stored energy to a grid or a structure (e.g., building), the DC energy must be converted to AC (alternating current), which introduces a need for a bidirectional inverter, which further increases system costs.

Use of photovoltaic solar (PV solar) energy introduces similar challenges as DC power is produced from the solar panels, which requires an inverter to convert the DC energy produced to AC. However, with PV solar, the inverter is typically unidirectional only and converts energy only from DC to AC. Accordingly, it would be advantageous if produced solar energy and an ESS, both being DC operated, transfer energy therebetween as DC and the combined energy can be converted to AC using one bidirectional inverter.

A DC-powered application that is rapidly growing in use includes fast EV charging stations. When an EV is connected to a fast EV charging station (hereafter "fast charger"), an internal converter within the EV is bypassed, as internal converters typically only allow charge rates lower than 10 KW. Conversely, for fast charging applications, the charge rate is usually higher than 50 KW, which may be delivered to the EV in the form of DC energy. The fast charger, if receiving the DC energy from the grid, will require an AC to DC inverter, which further increases costs associated with the fast charger. Accordingly, some direct DC chargers exist, which can be connected to a DC power source such as an energy storage battery.

In general, use of unopened second life EV battery packs enables unique use applications in comparison with other energy storage batteries. For example, power ratings of EV batteries are typically high due to automotive requirements in first life applications, which may include, but are not limited to, fast charging and acceleration. For example, although typical energy storage systems have power to energy ratios of 1:1 or 1:2, some EV batteries may have power to energy ratios of 3:1 or more (e.g., Nissan® Leaf Generation 1 battery rated at 24 kWh but capable of delivering 90 kW). Furthermore, unopened EV batteries include an internal BMS (battery monitoring system) with each battery that can be reprogrammed to meet second life application needs. Having both higher power ratings and flexibility from a reprogrammable BMS, EV batteries provide viable solutions for energy storage, particularly for an ESS consisting of unopened second life EV batteries.

The present disclosure provides a design for an ESS comprising one or more second life EV batteries. The system exploits reprogrammability of each BMS for an unopened second life EV battery. In various embodiments, a second life EV battery BMS may be connected to a controller, wherein each EV battery can be controlled by the controller to enable independent operation of the EV battery within the ESS. In various embodiments, the second life EV batteries included in the ESS may have power to energy ratios that facilitate independent battery operations by enabling each battery to receive or deliver high bursts of power (i.e., power levels greater than approximately two times the power to energy ratio). For example, some EV batteries may have charge/discharge rate capacity ranging from 2 C to 20 C (wherein a 1 C discharge rate is defined as a rate at which the capacity of the battery discharges in 1 hour, a 2 C discharge rate is defined as discharge of all capacity in 0.5 hours, etc.).

Referring generally to the accompanying drawings, a proposed energy storage system comprises one or more second life EV batteries that delivers energy received from one or more renewable energy systems. In various embodiments, energy from PV solar may be directed to the ESS, wherein it is distributed according to one or more application needs and priorities, which may be set by an operator and/or external triggers including, but not limited to, market price points (e.g., FIG. 1).

In various embodiments of the disclosure relates to assembling an ESS from a plurality of unopened second life EV batteries to enable energy-related cost reductions ($/KWh) and provide an ESS that can deliver high power. In various embodiments, each second life EV battery within the EES may operate as an independent energy storage system.

In various embodiments, a PV (photovoltaic) solar energy source may be used to charge the ESS. By limiting use of the PV solar energy to charging the ESS (i.e., instead of providing PV solar energy to a variable load), a solar energy-compatible DC/AC inverter is not needed. Since voltages related to DC energy provided by a PV solar energy source can vary depending on weather conditions and time of day, second life batteries within the ESS system may enable handling of variable charge voltages. For example, although the voltage for the battery varies depending on the state of charge of the battery, matching the voltage associated with the PV solar energy source with EV batteries within the ESS may enable handling of variable charge voltages. In various embodiments, a DC converter (e.g., DC-bus) can be used to correct the voltage range of received DC energy. In various embodiments, no DC converter (e.g., DC-bus) is used and instead a central controller within the ESS may read voltage and current received from the PV solar energy source and allocate a subset of second life batteries within the ESS to be charged. In an example, a second life battery, such as a 2011 Nissan® Leaf battery model, may contain 48 modules with 2 cells in each module. Correspondingly, a cell-level voltage variation may range from 3.2V-4.2V, a module-level voltage variation may range from 6.4V-8.4V, and a pack-level voltage variation may range from 307V-403V. Thus, for a PV solar energy source delivering energy with a voltage of approximately 1000V, the central controller within the ESS may allocate 3 second life EV batteries to be connected in series so that the batteries have a voltage window of 921V to 1209V. Accordingly, by limiting the PV solar energy source to only communicate with the ESS, the operations of the PV solar energy source may be simplified, system costs may be reduced (as no inverter is needed), and system hardware requirements may also be reduced by having fewer communication pathways (e.g., no connections from the PV solar energy source to a building and/or grid connection).

In various embodiments, a bidirectional inverter may be coupled between the ESS and additional loads, such as a grid and/or a building. In these embodiments, the bidirectional inverter may enable the ESS central controller to monitor and exchange AC energy by delivering AC energy to the building, purchasing AC energy from the grid, and/or sell surplus AC energy to the grid. Accordingly, by channeling all AC energy though the ESS, the central controller may allocate a subset of the second life EV batteries to do needed operations according to corresponding various ESS needs.

In various embodiments, a variable DC load (e.g., an EV fast charging station) may be connected to the ESS. The DC load may connected to the ESS central controller such that DC energy is delivered directly, or via a DC converter, to the DC load. In various embodiments, second life batteries can be receive energy simultaneously with the DC load, wherein a portion (e.g., half) of the energy may be used for energy delivery (discharge mode) to the DC load and another portion (e.g., half) may be used for energy supply (charge mode). Accordingly, when the DC load (e.g., fast charger) is in use, a subset of batteries within the ESS are simultaneously charged, preferably by a renewable energy source, or alternatively, by the grid. Furthermore, in operating primarily using DC energy, the ESS facilitates significant operational cost reductions. These cost reductions can be attributed reducing a number of inverters needed by the ESS, and by increasing efficiency of energy delivery by transporting energy as DC current at higher voltages (in comparison to converting to AC).

In various embodiments, the central controller may include software stored thereon that monitors production and consumption of energy by the ESS to determine and contribute to a balance of plant. In various embodiments, the controller may obtain various relevant parameters relating to the ESS system and connected components to determine the balance of plant, which may include, but are not limited to, grid price information, weather forecasting, diagnostic information (e.g., state of health, cycle number impedance, etc.) related to EV battery packs within the ESS, and/or historical information related to previous first life use of the batteries. The controller may facilitate a selection of type and/or amount of EV batteries for different uses within the ESS based on at least one of the obtained parameters. For example, if one or more batteries in the ESS show symptoms of strain (e.g., elevated temperature within a battery back, increase in impedance, voltage variations between cells in the battery pack, etc.), the batteries can be cycled (e.g., as controlled by the central controller) more frequently between discharge and charge states at lower capacities (e.g., approximately 60-80% of rated capacity) since full discharge and charge cycles is known to increase a rate of battery deterioration. Such battery-specific control within the ESS may contributed to extending an expected operational lifetime of the ESS.

Turning now to the figures, FIG. 1 shows a schematic representation of an ESS, according to various exemplary embodiments. FIGS. 2-5 accordingly show schematic representations of various use cases for the ESS, according to various exemplary embodiments. Each of the figures is intended to be representative only and in no way intended to limit scope of the present disclosure. Specifically, FIGS. 2-5 show various use scenarios wherein an ESS connected to a PV solar energy source, a fast charging station, a building, and/or to a grid.

FIG. 1 shows a schematic representation of a renewable energy system 100, which contains an ESS 130, according to an exemplary embodiment. As shown, the renewable energy system 100 includes a renewable energy source 110 operably coupled to an energy storage system (ESS) 130 via DC connection 120 (e.g., DC wire and DC plug or connector). In various embodiments, the renewable energy source 110 may be a photovoltaic (PV) energy source (e.g., solar panels), a wind-powered energy source (e.g., turbines), a water-powered energy source (e.g., dam), or any other source of renewable energy that may provide DC energy within the renewable energy system 100. In various embodiments, renewable energy source system 100 may include a plurality of renewable energy sources 110, each operably coupled to the ESS 130 via one or more DC connections 120. As shown, renewable energy source 110 may be configured to provide DC power to the ESS 130. The ESS 130 may include one or more second life EV batteries 133 (e.g., "EV 1") within an energy storage unit 135. In various embodiments, the batteries 133 within the ESS 130 may be stacked within a container. FIG. 1 shows ESS 130 including 32 second life batteries 133 within the energy storage unit 135, but in various embodiments, ESS 130 may include any number of second life batteries 133 (e.g., 1, 2, 15, 67, etc.) within the energy storage unit 135. Each of the second life batteries 135 may include a reprogrammable BMS, which may enable monitoring and/or control of each battery 135. Each of the second life batteries 135 may have a predetermined capacity, such that the plurality of second life batteries 135 within the ESS 130 may have a known capacity determined or based on the capacity of each individual battery 135. For example, if ESS 130 includes 32 second life EV batteries 135 each having 15 KWh storage capacity (e.g., Nissan® Leaf batteries), the plurality of batteries 135 form a 480 KWh ESS 130.

A central controller 137 within the ESS 130 may be communicatively and/or operatively coupled, via communication pathway 139, to each battery 135 within the energy storage unit 135 in the ESS 130. For example, the batteries 133 may be stacked and stored within a container and each wired to the central controller 137. In various embodiments, the central controller 137 may be operatively coupled to the BMS of each battery 133 such that the central controller 137 may be configured to receive information from each battery 133 and send one or more control signals to each battery 133. In various embodiments, the central controller 137 may receive one or more performance metrics or an operational status associated with each battery 133 (e.g., efficiency, impedance, maximum charge rate, state of charge/discharge, capacity, etc.). In various embodiments, the central controller 137 may receive historical information related to a first life use for each battery 133, wherein the historical information may include prior performance and/or use data stored with each battery 133 BMS. In various embodiments, the central controller 137 may be configured to send one or more control signals to one or more of the batteries 133, which may cause one or more of the batteries 133 to charge or discharge. In various embodiments, the central controller 137 may adjust a charge and/or discharge rate (e.g., c-rate) for one or more batteries 133. In various embodiments, the central controller 137 may group batteries 133 to be allocated for one or more application uses. The central controller 137 may divide all the batteries 133 within the storage unit 135 into multiple groups or subsets such that each battery 133 is included within an allocated group and wherein each group or subset is allocated by the controller 137 for a particular use. In various embodiments, the central controller 137 may divide the batteries 133 based on a power need, load demand the received performance metrics, and/or the operational status associated with each battery 133. In various embodiments, the central controller 137 may divide the batteries 133 based on a threshold associated with at least one of the operational status and performance metrics. In various embodiments, the central controller 137 may include hardware and software required to exchange communication (e.g., send control signals, receive information signals) with batteries 133. In various embodiments, the central controller 137 may include, but is not limited to, one or more controllers, one or more processors and/or microprocessors (e.g., CPU), a memory, etc. In various embodiments, the central controller 137 may include software in the form of non-transitory computer readable instructions stored thereon, such that the instructions may cause the central controller 137 to carry out one or more control operations and/or to query one or more batteries 133 for one or more information types.

As shown in FIG. 1, the ESS 130 enables any number of the batteries 133 within the storage unit 135 to deliver DC current via energy DC connection 140 to a bidirectional inverter 150, wherein delivered DC signals from the ESS 130 may be converted to AC. In various embodiments, AC signals. Signals converted from DC to AC by the power converter 150 may be directed to one or more external loads such as a grid 160 and/or a building 170. In various embodiments, the bidirectional power converter 150 may alternatively convert AC signals received from the grid 160 and/or building 170 and direct the converted DC signals to the ESS 130. As shown, ESS 130 may be operatively coupled to a variable load 190, which is configured to receive DC power from ESS 130 via DC connection 180. In various embodiments, the variable load 190 may be a fast charge station (e.g., for an EV and/or an EV battery). In various embodiments, if an amount of DC energy received from the renewable energy source 110 is not sufficient to charge the ESS 130 at a same or similar rate as a rate of energy consumption, the central controller 137 of the ESS 130 may enable delivery of energy from grid 160 and thus enable a balance of plant. Similarly, if an amount of energy received by the ESS 130 from the renewable energy source 110 is too high relative to an energy consumption rate, the central controller 137 may enable delivery of the surplus energy to the grid 160. In various embodiments, the central controller 137 may read a power meter connected to the grid 160 and a power meter connected to the renewable energy source 110 to determine a need for energy storage (i.e., a need for energy storage within ESS 130). In various embodiments, the central controller 137 may be programmed (e.g., by a user and/or manufacturer, determined over time through operation) with threshold values for needed energy use based on weather forecasting, lifetime assessment of the battery backs 133, and/or environmental impact, etc.

Figure 2:
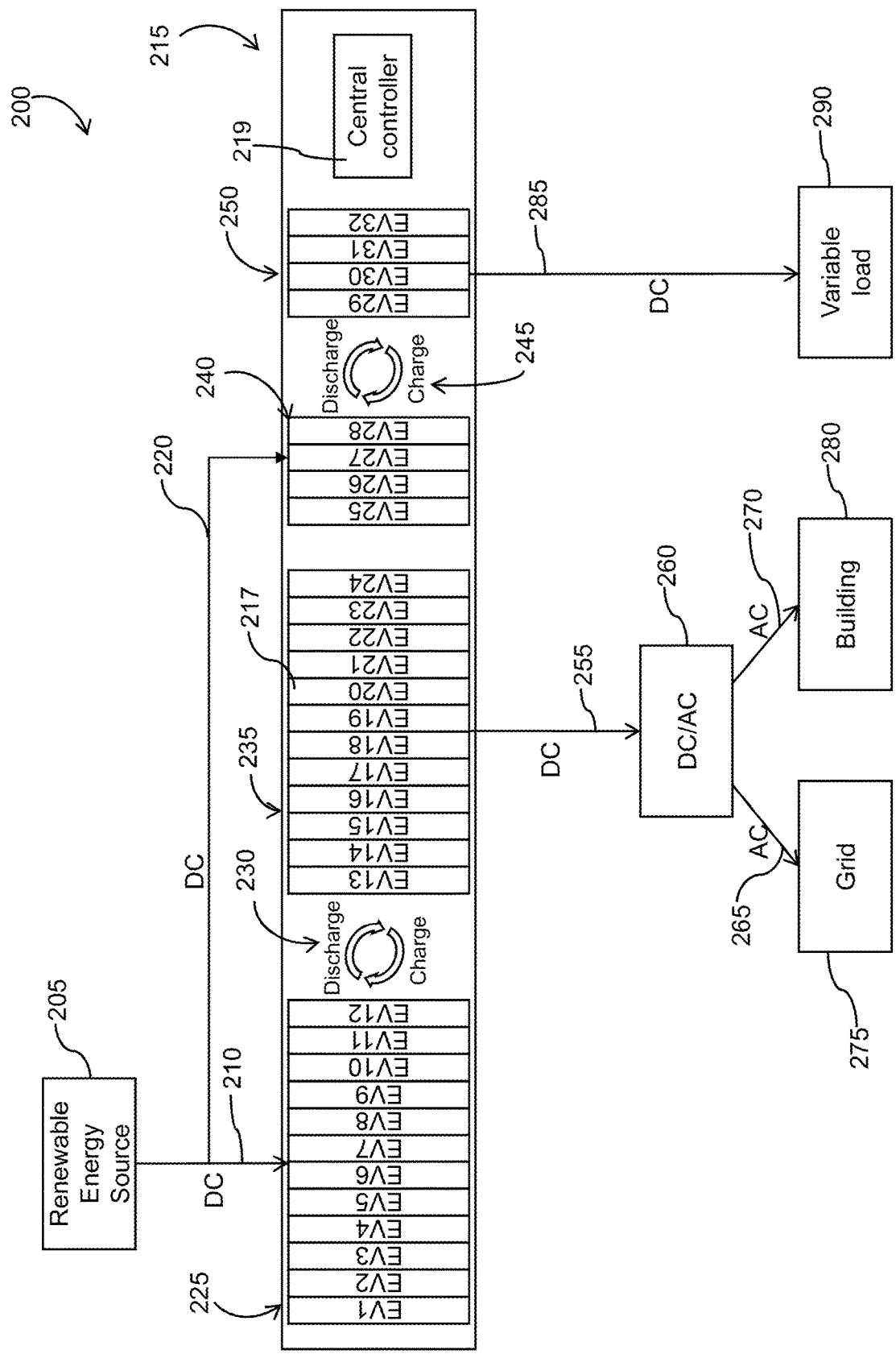
FIG. 2 shows a schematic representation of a renewable energy system during a daytime scenario and corresponding allocation of stored energy within the system, according to an exemplary embodiment.

FIG. 2 shows a schematic representation of a renewable energy system 200 (similar or equivalent to system 100) having an ESS 215 (similar or equivalent to ESS 130) operating during a daytime scenario, according to various exemplary embodiments. As shown, the renewable energy system 200 includes an ESS 215 containing a plurality of second life EV batteries 217 (similar or equivalent to batteries 133), which are controlled by a central controller 219 (similar or equivalent to controller 137). The ESS 215 is operatively coupled to a renewable energy source 205 (similar or equivalent to renewable energy source 110), a bidirectional power converter 260 (similar or equivalent to converter 150), and a variable load 290 (similar or equivalent to variable load 190) via DC connections 210 and 220, 255, and 285, respectively. The bidirectional power converter 260 may be further coupled to a grid 275 and a building 280 via AC connections 265 and 270, respectively. In various embodiments, the renewable energy source 205 may be a PV solar energy source (e.g., one or more solar panels). The variable load 290 may be operatively coupled to the ESS 215, which is configured to receive DC power from the ESS 215. As illustrated in FIG. 2, DC energy production from the renewable energy source 205 (e.g., PV solar energy system) may be high (e.g., requiring approximately 50% or more of the battery packs within the ESS 215) and the demand for energy from building 280 operatively coupled to the ESS 215 may also be high. In this embodiment a demand for energy by the variable load 290 (e.g., fast charger) is medium (e.g., requiring approximately 25-50% of the batteries within the ESS 215) and a price of energy delivered from the grid 275 is medium. Accordingly, ESS 215 may receive power from the renewable energy source 205 and deliver power to the power converter 255 (to be converted to AC) and directed to the grid 275 and/or building 280. Such scenario may be representative of an energy profile typical for a populated structure (e.g., school or office building) during a sunny weekday (i.e., sufficient solar energy for renewable energy source 205), wherein structure occupants may have a high need for energy (e.g., working) thus driving a high energy demand for the building 280 whereas other loads (e.g., variable load 190) is comparably medium.

In various embodiments, central controller 219 may control each battery 217 within the ESS 215 such that each battery 217 may be grouped and/or allocated for a specific use application or charge/discharge scenario. Accordingly, as any of the second life EV batteries 217 or battery packs (within the ESS 215) may be allocated to any use application, the controller 219 may allocate a battery 217 to first group 225 ("EV1-EV12"), a second group 235 ("EV13-EV24"), a third group 240 ("EV25-EV28"), and a fourth group 250 ("EV29-EV32"), as shown in FIG. 2. As illustrated, with the high production of solar energy, the first group 250 is allocated for storage produced solar energy (via DC connection 210) and the second group 235 is allocated for delivery of stored energy (via DC connection 255) to the power converter 260. From the bidirectional power converter 260, AC energy may then be delivered to the building 280 (via AC connection 270) to meet its energy demands and any surplus energy may be delivered to the grid 275 (via AC connection 265). Furthermore, to maintain capability of the ESS 215 to support the external load 290 (e.g., fast charger), the fourth group 250 ("EV29-EV32") may be maintained at 100% state of charge (SOC) to deliver sufficiently high power energy to the variable load 290. As shown in FIG. 2, the first group 225 and the second group 235 may form a charge/discharge pair 230, wherein while the first group 225 is charging (i.e., receiving energy from the renewable energy source 205 via DC connection 210), the second group 235 is discharging (i.e., providing energy to the power converter 255). Likewise, the third group 240 and the fourth group 250 may form another discharge pair 245, wherein while the third group 240 is charging (i.e., receiving energy from the renewable energy source 205 via DC connection 220), the fourth group 250 is discharging (i.e., providing energy to the variable load 190). In various embodiments, when one of the groups in a charge/discharge pair 230 or 245 falls below a capacity or charge threshold, then the groups within the pair may switch from charging to discharging or vice versa (e.g., via a switchgear within or operated by the controller 219). Thus, the controller 219 may allocate the batteries 217 within the ESS 215 to support one or more use applications.

In an exemplary embodiment, if the second life EV batteries/battery packs 217 within the ESS 215 each have a 15 KWh power rating (e.g., Nissan® Leaf batteries), then 60 KWh can be delivered to the variable load 290 from group 250 (or, alternately from 240). In an embodiment where the variable load 290 is a 30 KWh fast charging station, then delivery of power from fourth group 250 would then empty 2 batteries/battery packs 217 within the fourth group 250 (or alternately within 240) in ESS 215. Accordingly, when a capacity or charge level of the group 250 falls beneath a threshold value (e.g., determined by user or controller 219), the central controller 219 may cause groups 250 and 240 to switch such that group 250 may go into a charge mode and group 240 may go into a discharge mode. Alternatively, the central controller 219 may cause only the batteries 217 from the group 250 that fall below the threshold to enter a charge mode while maintaining the remaining batteries 217 in the group 250 in a discharge mode. In various embodiments, the central controller 219 may cause similar switching operations for groups 225 and/or 235 and/or for batteries 217 contained therein to charge or discharge based on energy needs of AC power-supported components including grid 275 and building 280.

Figure 3:
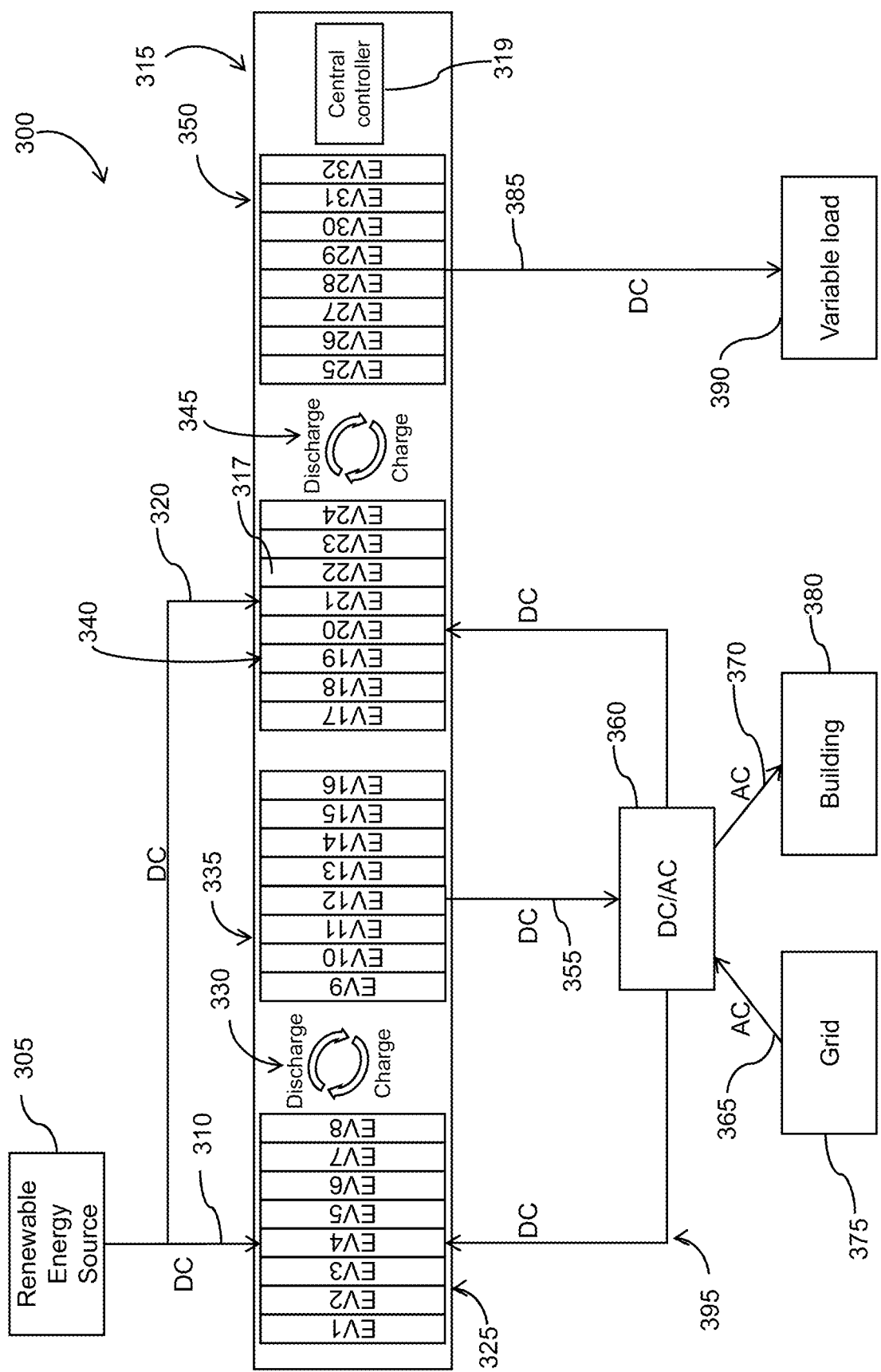
FIG. 3 shows a schematic representation of a renewal energy system during an evening scenario and corresponding allocation of stored energy within the system, according to an exemplary embodiment.

FIG. 3 shows a schematic representation of a renewable energy system 300 (similar or equivalent to systems 100 and/or 200) having an ESS 315 (similar or equivalent to ESS 130, 215) operating during an evening scenario, according to various exemplary embodiments. As shown, the renewable energy system 300 includes an ES 315 containing a plurality of second life EV batteries 317 (similar or equivalent to batteries 113, 217), which are controlled by a central controller 319 (similar or equivalent to controller 137, 219). The ESS 315 is operatively coupled to a renewable energy source 305 (similar or equivalent to renewable energy source 110, 205), a bidirectional power converter 360 (similar or equivalent to converter 150, 260) via DC connections 310 and 320, 355, and 385, respectively. The bidirectional power converter 360 may be further coupled to a grid 375 and a building 380 via AC connections 365 and 370, respectively. In various embodiments, the renewable energy source 305 may be a PV solar energy source (e.g., one or more solar panels). The renewable energy system 300 may also include a variable load 390 (similar or equivalent to load 290) operatively coupled to the ESS 315, which is configured to receive DC power from the ESS 315. As illustrated in FIG. 3, DC energy production from the renewable energy source 305 (e.g., PV solar energy system) may be low. Accordingly, the central controller 319 may allocate a first group 325 ("EV1-EV8") to be charged from the renewable energy source 305, wherein a size (i.e., number of batteries 317 contained therein) of the first group 325 may be smaller than a corresponding size of group 225 (as shown in FIG. 2). In addition, DC power may be delivered to the ESS 315, specifically groups 325 and 340, from the grid 375 via the power converter 360. As building 380 and/or variable load 390 may continue power demand during an evening scenario despite a lowered energy production by the renewable energy source 305, the additional power delivered from grid 375 (i.e., grid support) may enable the ESS 315 to support the power needs of the building 360 and/or the variable load 390. Furthermore, to support the power needs of the building 360, a second group 335 ("EV9-EV16") may be in a discharge mode so as to deliver energy to power converter 360 for delivery to the building 380. As shown, energy delivered to the converter 360 via DC connection 355 may be converted to AC and delivered to the building 380 via AC connection 370. As illustrated, a fourth group 350 ("EV25-EV32") may be allocated (e.g., via the controller 319) to deliver DC energy (via DC connection 385) to the variable load 390 (e.g., fast charger). Thus, during an evening scenario, less energy from renewable energy source 305 (e.g., PV solar energy system) may be available and thus, controller 319 may cause connections to grid 375 to be used for supplying energy needed to provide balance of plant within the renewable energy system 300.

Figure 4:
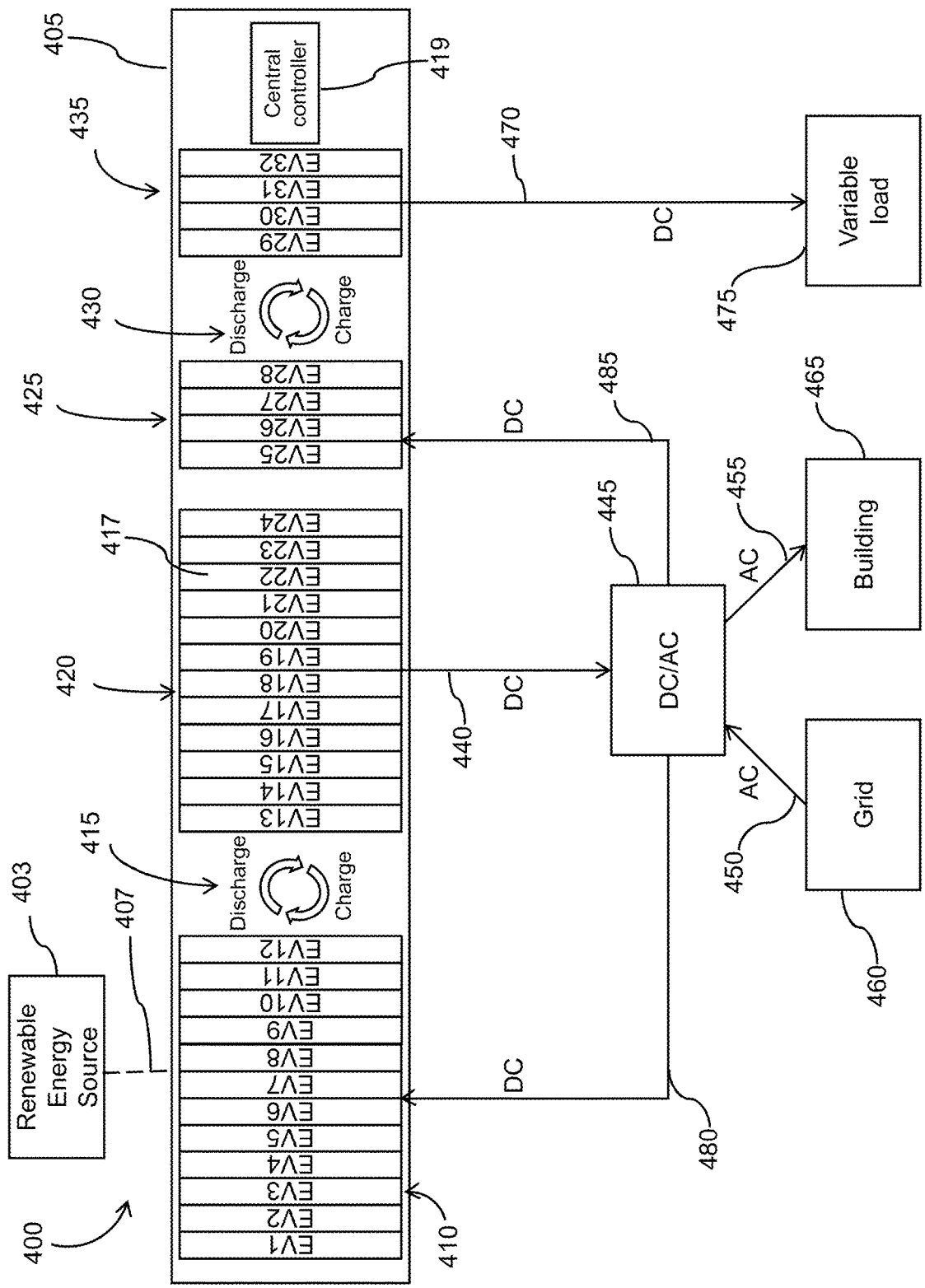
FIG. 4 shows a schematic representation of a renewable energy system during a morning scenario and corresponding allocation of stored energy within the system, according to an exemplary embodiment.

FIG. 4 shows a schematic representation of a renewable energy system 400 (similar or equivalent to systems 100, 200, 300) having an ESS 405 (similar or equivalent to ESS 130, 215, 315) operating during a nighttime scenario, according to various exemplary embodiments. As shown, the renewable energy system 400 includes an ESS 405 containing a plurality of second life EV batteries 417 (similar or equivalent to batteries 133, 217, 317), which are controlled by a central controller 419 (similar or equivalent to controller 137, 219, 319). The ESS 405 is communicatively coupled to a renewable energy source 403 (similar or equivalent to renewable energy source 110, 205, 305), a bidirectional power converter 445 (similar or equivalent to converter 150, 260, 360), and a variable load 475 (similar or equivalent to 190, 290, 390). The bidirectional power converter 445 may be further coupled to a grid 460 and a building 465 via AC connections 450 and 455, respectively. The variable load 475 may be operatively coupled to the ESS 405, which is configured to receive DC power from the ESS 405. As illustrated in FIG. 4, DC energy production from the renewable energy source 403 (e.g., PV solar energy system) may be unavailable via a connection 407 during a nighttime scenario. However, demand for energy from building 465 may remain high. In this embodiment, a demand for energy from the variable load 475 (e.g., fast charger) may be low relative to the energy demand from the building 465. Accordingly, the central controller 419 may allocate a first group 410 ("EV1-EV12") to be charged from the grid 460 and a second group 420 ("EV13-EV24") to be discharged by delivering power to building 465. Furthermore, the central controller 419 may allocate a third group 425 ("EV25-EV28") to be charged from the grid 460 and a fourth group 435 ("EV29-EV32"). As energy from renewable energy source 403 is unavailable, energy demand by building 465 is high, and energy demand from variable load 475 is low, the central controller 419 may allocate the groups 410, 420, 430, and 435 such that a size (i.e., number of batteries 417 contained therein) of the first groups 410 and 420 may be large relative to corresponding sizes of groups 420 and 435. Accordingly, Groups 410 and 420 may form a charge/discharge pair 415 wherein group 420 may provide energy to building 465 while group 410 charges from grid 460 in the absence of energy from renewable energy source 403. Thus, during the nighttime scenario, no energy from renewable energy source 403 (e.g., PV solar energy system) may be available and thus, controller 419 may allocate additional batteries 417 for connections to grid 460 to be used for supplying energy needed to provide balance of plant within the renewable energy system 400.

Figure 5:
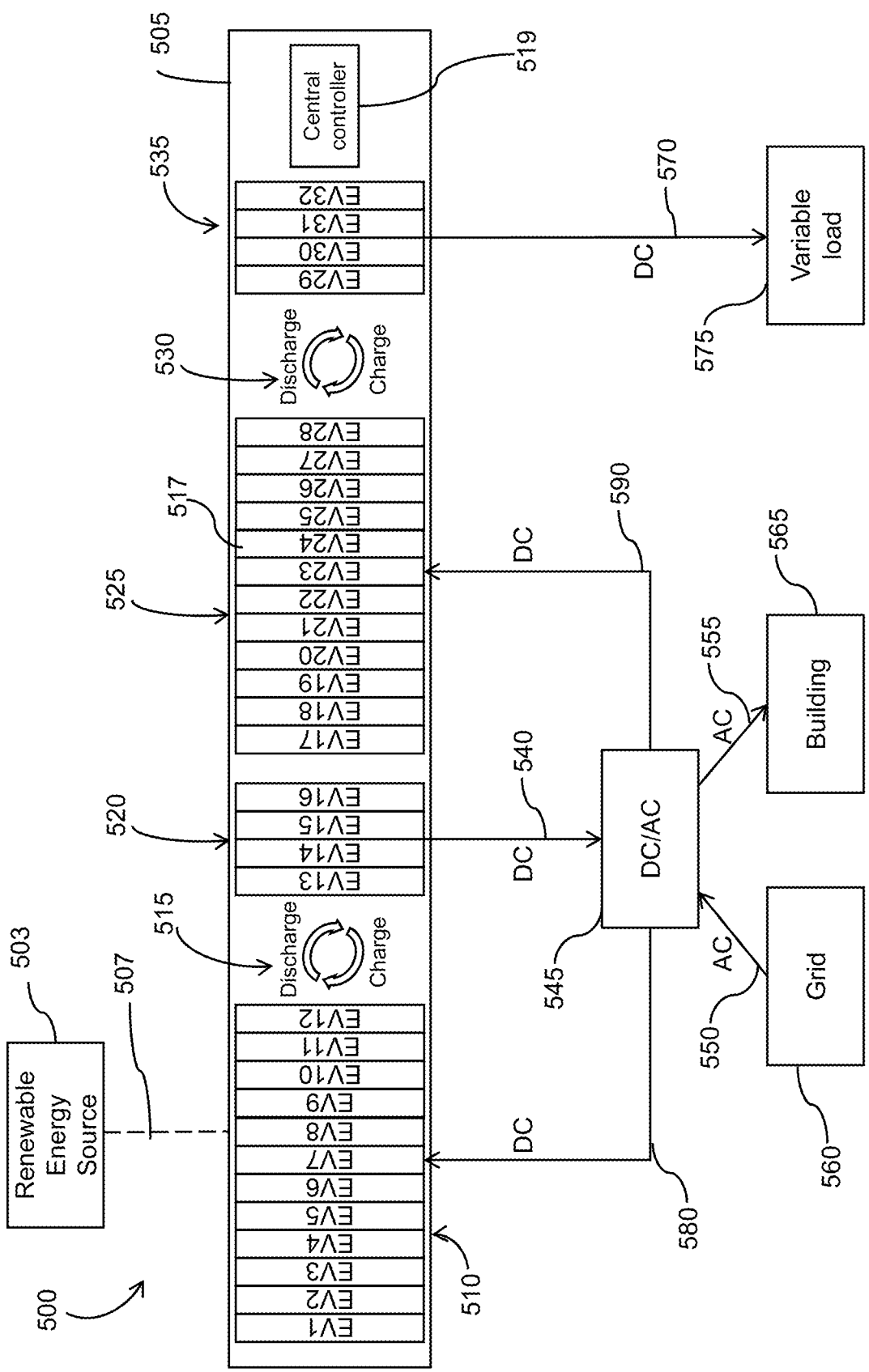
FIG. 5 shows a schematic representation of a renewable energy system during a nighttime scenario and corresponding allocation of stored energy within the system, according to an exemplary embodiment.

FIG. 5 shows a schematic representation of a renewable energy system 500 (similar or equivalent to systems 100, 200, 300, 400) having an ESS 505 (similar or equivalent to ESS 130, 215, 315, 405) operating during a morning scenario, according to various exemplary embodiments. As shown, the renewable energy system 500 includes an ESS 505 containing a plurality of second life EV batteries 517 (similar or equivalent to batteries 133, 217, 317, 417), which are controlled by a central controller 519 (similar or equivalent to controller 137, 219, 319, 419). The ESS 505 is communicatively coupled to a renewable energy source 503 (similar or equivalent to renewable energy source 110, 205, 305, 403), a bidirectional power converter 545 (similar or equivalent to converter 150, 260, 360, 445), and a variable load 575 (similar or equivalent to 190, 290, 390, 475). The bidirectional power converter 545 may be further coupled to a grid 560 and a building 565 via AC connections 550 and 555, respectively. The variable load 575 may be operatively coupled to the ESS 505, which is configured to receive DC power from the ESS 505. As illustrated in FIG. 5, DC energy production from the renewable energy source 503 (e.g., PV solar energy system) may be unavailable via a connection 507 during a morning scenario. Demand for energy from building 565 and variable load 575 (e.g., fast charger) may be low (i.e., relative to daytime, evening). As power demands on renewable energy system 500 are low, controller 519 may prioritize charging batteries 517 within the ESS 505 in preparation for high power demand conditions (e.g., daytime). Accordingly, the central controller 519 may allocate group 510 ("EV1-EV12") and group 525 ("EV17-EV28") to be charged from the grid 560. The controller 519 may also allocate group 520 ("EV13-EV16") and group 535 ("EV29-EV32") to be discharged by delivering power to building 565 and variable load 575, respectively. As energy from renewable energy source 503 is unavailable, energy demand by building 565 is low, and energy demand from variable load 575 is low, the central controller 519 may allocate the groups 510, 520, 530, and 535 such that a size (i.e., number of batteries 517 contained therein) of charging groups 510 and 525 are larger relative to corresponding sizes of groups 520 and 535. Accordingly, Groups 510 and 520 may form a charge/discharge pair 515 wherein group 520 may provide energy to building 565 while group 510 charges from grid 560 in the absence of energy from renewable energy source 503. Furthermore, when batteries 517 from within the discharging groups 520 and/or 535 are discharged below a threshold amount, the central controller 519 may reallocate batteries 517 within the groups. Accordingly, during the morning scenario, no energy from renewable energy source 503 (e.g., PV solar energy system) may be available and thus, controller 519 may allocate additional batteries 517 for connections to grid 560 to be used for charging, in addition to supplying energy needed to provide balance of plant within the renewable energy system 500.

In various embodiments, a number of batteries/battery packs within allocated groups determined by the central controller may be even or odd. In various embodiments, each allocated group may include an equal number of batteries therein. In various embodiments, each allocated group may include a different number of batteries therein. In various embodiments, a number of batteries in each allocated group determined by the central controller may be dependent on at least one of a time of day, an energy or power demand by a coupled load (e.g., building, variable load), and an amount of energy or power available from a coupled renewable energy source. In various embodiments, in a scenario wherein the renewable energy system experiences high energy demands in the evening (e.g., heavy use of a fast charging station), the central controller may allocate almost all batteries within the ESS to be discharged to supply energy to meet the high energy demand. Accordingly, during a nighttime scenario when grid electricity may less expensive compared to times, the central controller may allocate discharged batteries within the ESS to be coupled to the grid for charging. During a morning scenario when a connected load (e.g., building) may require surplus of energy for startup operations, the central controller may allocate batteries to provide the surplus through discharging before energy from a renewable energy source becomes available. In various embodiments, the central controller may be configured to iteratively or periodically change battery allocations, groupings, charge/discharge modes or operations, rates of charging/discharging, and/or use applications.

In various embodiments, the central controller may include software stored therein. In various embodiments, the central controller software may include one or more algorithms that may enable self-learning processes based on operation parameters and/or conditions associated with the renewable energy system to capture habits, thereby, predicting future events, and take precautionary actions. In various embodiments, the algorithms may analyze stored information (e.g., within a memory of the central controller) to determine future operations, power needs, and/or load demands. For example, the algorithms may calculate and/or predict a best use and/or battery allocation within the ESS based on a time of day, weather condition, use application, etc. In various embodiments, the central controller may implement the software to facilitate saving energy for predicted peak demand shaving needs to prepare the renewable energy system for specific anticipated periods of high demand from coupled variable loads.

According to an aspect of the present disclosure, a method for reusing an unopened electric vehicle battery within a renewable energy system includes: receiving, by a central controller within an energy storage system, a signal from a control unit coupled to an electric vehicle battery; determining, by the central controller, a status of the electric vehicle battery based on the received signal; receiving, by the central controller, a current load demand associated with the energy storage system; allocating, by the central controller, the electric vehicle battery to a load application based on the current load demand and the determined electric vehicle battery status; and switching, by the central controller, the electric vehicle battery from a first operational mode to a second operational mode. In various embodiments, the electric vehicle battery is allocated to the load application if the electric vehicle status satisfies a threshold state of charge.

In various embodiments, switching the electric vehicle battery from the first operational mode to the second operational mode is based on the status of the electric vehicle battery. In various embodiments, switching the electric vehicle battery from the first operational mode to the second operational mode is based on a type of load demand. In various embodiments, switching the electric vehicle battery from the first operational mode to the second operational mode is based on a time of day.

In various embodiments, the method further includes determining, by the central controller, a power delivery amount from a renewable energy source coupled to the energy storage system, wherein the current load demand state is based on the power delivery amount. In various embodiments, the method also includes: accumulating, by the central controller, historical information associated with the energy storage system; comparing, by the central controller, the current load demand to the historical information; and predicting, by the central controller, a future load condition based on the comparison of the current load demand and the historical information.

According to another aspect of the present disclosure, a method for reusing unopened electric vehicle batteries within a renewable energy system includes: receiving, by a central controller within an energy storage system, a plurality of signals from a corresponding plurality of control units; determining, by the central controller, a status of each of the plurality of electric vehicle batteries based on the plurality of signals; determining, by the central controller, a current load demand associated with the energy storage system; and allocating, by the central controller, a first subset of the plurality of electric vehicle batteries to a first load application based on the current load demand and the determined electric vehicle battery status of each of the plurality of electric vehicle batteries. In various embodiments, the plurality of control units further correspond to a plurality of electric vehicle batteries, and wherein each of the plurality of control units is operatively coupled to each of the plurality of electric vehicles, respectively. In various embodiments, the first subset of the plurality of electric vehicle batteries is allocated to the first load application if the status of each of the first plurality of electric vehicle batteries satisfies a threshold state of charge.

In various embodiments, the method further includes determining, by the central controller, a size of the first subset of the plurality of electric vehicles, wherein the size is based on a magnitude of the load demand. In various embodiments, the method also includes: determining, by the central controller, a power delivery amount from a renewable energy source coupled to the energy storage system, wherein the current load demand state is based on the power delivery amount. In various embodiments, the method further includes determining, by the central controller, a second subset of the plurality of electric vehicle batteries; and allocating, by the central controller, the second subset of the plurality of electric vehicle batteries to a second load application based on the load demand.

In various embodiments, the method further includes: identifying, by the central controller, a first electric vehicle battery within the first subset of the plurality of electric vehicle batteries; identifying, by the central controller, a second electric vehicle battery within the second subset of the plurality of electric vehicle batteries; and reallocating, by the central controller, each of the first electric vehicle battery and the second electric vehicle battery such that the first electric vehicle battery is moved to the second subset of the plurality of electric vehicle batteries and the second electric vehicle battery is moved to the first subset of the plurality of electric vehicle batteries. In various embodiments, reallocating each of the first electric vehicle battery and the second electric vehicle battery is based on a time of day. In various embodiments, reallocating each of the first electric vehicle battery and the second electric vehicle battery is based on an updated load state associated with the energy storage system.

In various embodiments, the method also includes: switching, by the central controller, the first subset of the plurality of electric vehicle batteries from a charging state to a discharging state; and switching, by the central controller, the second subset of the plurality of electric vehicle batteries from a discharging state to a charging state.

According to another aspect of the disclosure, a renewable energy system for reusing unopened second life electric vehicle batteries includes: an energy storage unit, wherein the energy storage unit includes an electric vehicle battery having a coupled control unit; and a central controller within the energy storage unit, wherein the central controller is operably coupled to the electric vehicle battery via the control unit. In various embodiments, the central controller is configured to: receive a signal from the control unit coupled to the electric vehicle battery; determine a status of the electric vehicle battery based on the received signal; determine a current load demand associated with the energy storage system; allocate the electric vehicle battery to a load application based on the current load demand and the determined status, wherein the electric vehicle battery is allocated to the load application if the state of charge satisfies a threshold state of charge; and switch the electric vehicle battery from a first operational mode to a second operational mode.

In various embodiments, the energy storage unit is operably coupled to a renewable energy source and wherein the renewable energy source is configured to deliver energy to the energy storage unit. In various embodiments, the controller is further configured to determine a power delivery amount from the renewable energy source, wherein the current load demand state is based on the power delivery amount.

In various embodiments, the controller is further configured to: accumulate historical information associated with the energy storage system; compare the current load demand to the historical information; and predict a future load condition based on the comparison of the current load demand and the historical information. In various embodiments, the controller is configured to switch the electric vehicle battery from the first operational mode to the second operational mode based on a type of load demand. In various embodiments, the controller is configured to switch the electric vehicle battery from the first operational mode to the second operational mode based on a time of day.

Notwithstanding the embodiments described above in FIGS. 1-5, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. A method for reusing an unopened electric vehicle battery within a renewable energy system, the method comprising:
   receiving, by a central controller within an energy storage system, a signal from a control unit coupled to an electric vehicle battery;
   determining, by the central controller, first information, the first information being historical information corresponding to a first use of the electric vehicle battery occurring prior to reusing the electric vehicle battery;
   determining, by the central controller, a status of the electric vehicle battery based on the received signal, the signal including at least one of a temperature, an impedance, or a voltage, wherein determining the status of the electric vehicle battery comprises determining the electric vehicle battery is showing one or more symptoms of strain based on the signal;
   receiving, by the central controller, a current load demand associated with the energy storage system;
   allocating, by the central controller, the electric vehicle battery to a load application based on the current load demand and the determined electric vehicle battery status;
   wherein the electric vehicle battery is allocated to the load application if the electric vehicle battery status satisfies a threshold state of charge; and
   responsive to receiving the signal and based on the first information, switching, by the central controller, the electric vehicle battery from a first operational mode to a second operational mode, wherein switching comprises increasing a cycling frequency at a predetermined percent rated capacity of the electric vehicle battery.

2. The method of claim 1, wherein switching the electric vehicle battery from the first operational mode to the second operational mode is based on a type of load demand.

3. The method of claim 1, wherein switching the electric vehicle battery from the first operational mode to the second operational mode is based on a time of day.

4. The method of claim 1, further comprising:
   determining, by the central controller, a power delivery amount from a renewable energy source coupled to the energy storage system;
   wherein the current load demand state is based on the power delivery amount.

5. The method of claim 1, further comprising:
   accumulating, by the central controller, second information, the second information being historical information associated with the energy storage system;
   comparing, by the central controller, the current load demand to the second information; and
   predicting, by the central controller, a future load condition based on the comparison of the current load demand and the second information.

6. A method for reusing unopened electric vehicle batteries within a renewable energy system, the method comprising:
   receiving, by a central controller within an energy storage system, a plurality of signals from a corresponding plurality of control units;
   wherein the plurality of control units further correspond to a plurality of electric vehicle batteries, and wherein each of the plurality of control units is operatively coupled to each of the plurality of electric vehicles, respectively;
determining, by the central controller, historical information corresponding to a first use of each of the plurality of electric vehicle batteries occurring prior to reusing the plurality of electric vehicle batteries;
determining, by the central controller, a status of each of the plurality of electric vehicle batteries based on the plurality of signals, each of the plurality of signals including at least one of a temperature, an impedance, or a voltage, wherein determining the status of each of the plurality of electric vehicle batteries comprises determining each of the plurality of electric vehicle batteries is showing one or more symptoms of strain based on the plurality of signals;
determining, by the central controller, a current load demand associated with the energy storage system;
allocating, by the central controller, a first subset of the plurality of electric vehicle batteries to a first load application based on the current load demand and the determined electric vehicle battery status of each of the plurality of electric vehicle batteries;
wherein the first subset of the plurality of electric vehicle batteries is allocated to the first load application if the status of each of the first plurality of electric vehicle batteries satisfies a threshold state of charge; and
responsive to receiving the plurality of signals and based on the historical information, switching, by the central controller, a second subset of the plurality of electric vehicle batteries to a discharge state or a charge state, wherein switching comprises increasing a cycling frequency at a predetermined percent rated capacity of each electric vehicle battery of the second subset of the plurality of electric vehicle batteries.

7. The method of claim 6, further comprising:
determining, by the central controller, a size of the first subset of the plurality of electric vehicle batteries;
wherein the size is based on a magnitude of the load demand.

8. The method of claim 6, further comprising:
determining, by the central controller, a power delivery amount from a renewable energy source coupled to the energy storage system;
wherein the current load demand state is based on the power delivery amount.

9. The method of claim 6, further comprising:
allocating, by the central controller, the second subset of the plurality of electric vehicle batteries to a second load application based on the load demand.

10. The method of claim 9, further comprising:
identifying, by the central controller, a first electric vehicle battery within the first subset of the plurality of electric vehicle batteries;
identifying, by the central controller, a second electric vehicle battery within the second subset of the plurality of electric vehicle batteries; and
reallocating, by the central controller, each of the first electric vehicle battery and the second electric vehicle battery such that the first electric vehicle battery is moved to the second subset of the plurality of electric vehicle batteries and the second electric vehicle battery is moved to the first subset of the plurality of electric vehicle batteries.

11. The method of claim 10, wherein reallocating each of the first electric vehicle battery and the second electric vehicle battery is based on a time of day.

12. The method of claim 10, wherein reallocating each of the first electric vehicle battery and the second electric vehicle battery is based on an updated load state associated with the energy storage system.

13. The method of claim 9, wherein switching the second subset of the plurality of electric vehicle batteries to a discharge stage comprises:
switching, by the central controller, the first subset of the plurality of electric vehicle batteries from a charging state to a discharging state; and
switching, by the central controller, the second subset of the plurality of electric vehicle batteries from a discharging state to a charging state.

14. A renewable energy system for reusing unopened second life electric vehicle batteries, the system comprising:
an energy storage unit, wherein the energy storage unit includes an electric vehicle battery having a coupled control unit; and
a central controller within the energy storage unit, wherein the central controller is operably coupled to the electric vehicle battery via the control unit;
wherein the central controller is configured to:
receive a signal from the control unit coupled to the electric vehicle battery, the signal including at least one of a temperature, an impedance, or a voltage;
determine first information, the first information being historical information corresponding to a first use of the electric vehicle battery occurring prior to reusing the electric vehicle battery;
determine a status of the electric vehicle battery based on the received signal, wherein determining the status of the electric vehicle battery comprises determining the electric vehicle battery is showing one or more symptoms of strain based on the signal;
determine a current load demand associated with the energy storage system;
allocate the electric vehicle battery to a load application based on the current load demand and the determined status;
wherein the electric vehicle battery is allocated to the load application if the state of charge satisfies a threshold state of charge; and
responsive to receiving the signal and based on the first information, switch the electric vehicle battery from a first operational mode to a second operational mode, wherein switching comprises increasing a cycling frequency at a predetermined percent rated capacity of the electric vehicle battery.

15. The system of claim 14, wherein the energy storage unit is operably coupled to a renewable energy source and wherein the renewable energy source is configured to deliver energy to the energy storage unit.

16. The system of claim 15, wherein the controller is further configured to determine a power delivery amount from the renewable energy source, wherein the current load demand state is based on the power delivery amount.

17. The system of claim 14, wherein the controller is further configured to:
accumulate second information, the second information being historical information associated with the energy storage system;
compare the current load demand to the second information; and
predict a future load condition based on the comparison of the current load demand and the second information.

18. The system of claim 14, wherein the controller is configured to switch the electric vehicle battery from the first operational mode to the second operational mode based on a type of load demand.

19. The method of claim 14, wherein the controller is configured to switch the electric vehicle battery from the first operational mode to the second operational mode based on a time of day.

* * * * *